United States Patent [19]
Appleton

[11] 3,801,131
[45] Apr. 2, 1974

[54] SEALED ELECTRICAL CONNECTOR FOR SECURING CONDUITS TO JUNCTION BOXES

[76] Inventor: Arthur L. Appleton, c/o Appleton Electric Company, 1701 Wellington Ave., Northbrook, Ill. 60657

[22] Filed: Apr. 30, 1973

[21] Appl. No.: 355,727

Related U.S. Application Data

[63] Continuation-in-part of Ser. No. 280,515, Aug. 14, 1972, abandoned.

[52] U.S. Cl................ 285/159, 174/65 R, 285/207
[51] Int. Cl............................................. H02g 3/06
[58] Field of Search .......... 174/51, 64, 65 R, 65 SS, 174/77 R, 84 S, 94 R, 151; 24/126 R, 126 L, 24/126 C, 136 B; 248/56; 277/117, 119, 277/122, 223; 285/158, 159, 161, 205–207, 285/213–217, 249, 323, 324, 339, 343, 385, 389

[56] References Cited
UNITED STATES PATENTS

| | | | |
|---|---|---|---|
| 934,995 | 9/1909 | Church | 174/64 X |
| 939,501 | 11/1909 | Hinds | 285/343 X |
| 1,700,012 | 1/1929 | Zublin | 277/223 |
| 1,879,920 | 9/1932 | Church | 285/215 X |
| 2,166,458 | 7/1939 | Berndt et al. | 174/94 R X |
| 2,250,685 | 7/1941 | Tiefenbacher et al. | 285/217 X |
| 2,452,184 | 10/1948 | Cole | 285/159 |
| 2,475,741 | 7/1949 | Goeller | 285/324 X |
| 2,674,470 | 4/1954 | Appleton | 285/159 |

FOREIGN PATENTS OR APPLICATIONS

| | | | |
|---|---|---|---|
| 1,112,566 | 11/1955 | France | 285/249 |
| 631 | 1/1905 | Great Britain | 285/217 |

Primary Examiner—Laramie E. Askin
Attorney, Agent, or Firm—Wolfe, Hubbard, Leydig, Voit & Osann, Ltd.

[57] ABSTRACT

A connector for securing one end of an unthreaded flexible electrical conduit to the sidewall of an outlet box or the like, comprising a relatively thick-walled, hollow bushing that is adapted to fit into the knockout opening and slidably receive the conduit therein, the bushing having a longitudinally split rear portion and one or more external slots generally equally spaced around its circumference and a reduced diameter portion at its opposite end, the split portion and slots each containing a rubber-like deformable material for substantially prohibiting the passage of fluid therethrough and a nut adapted to threadingly engage a threaded intermediate portion of the bushing and constrict the bushing for clamping the conduit, the slots providing a reduced bushing wall thickness enabling bending of the bushing during constriction, thereby providing generally uniform clamping around the conduit. The nut has an inwardly depending radial flange which engages the reduced diameter portion to lend support against rocking by the bushing.

2 Claims, 7 Drawing Figures

PATENTED APR 2 1974    3,801,131
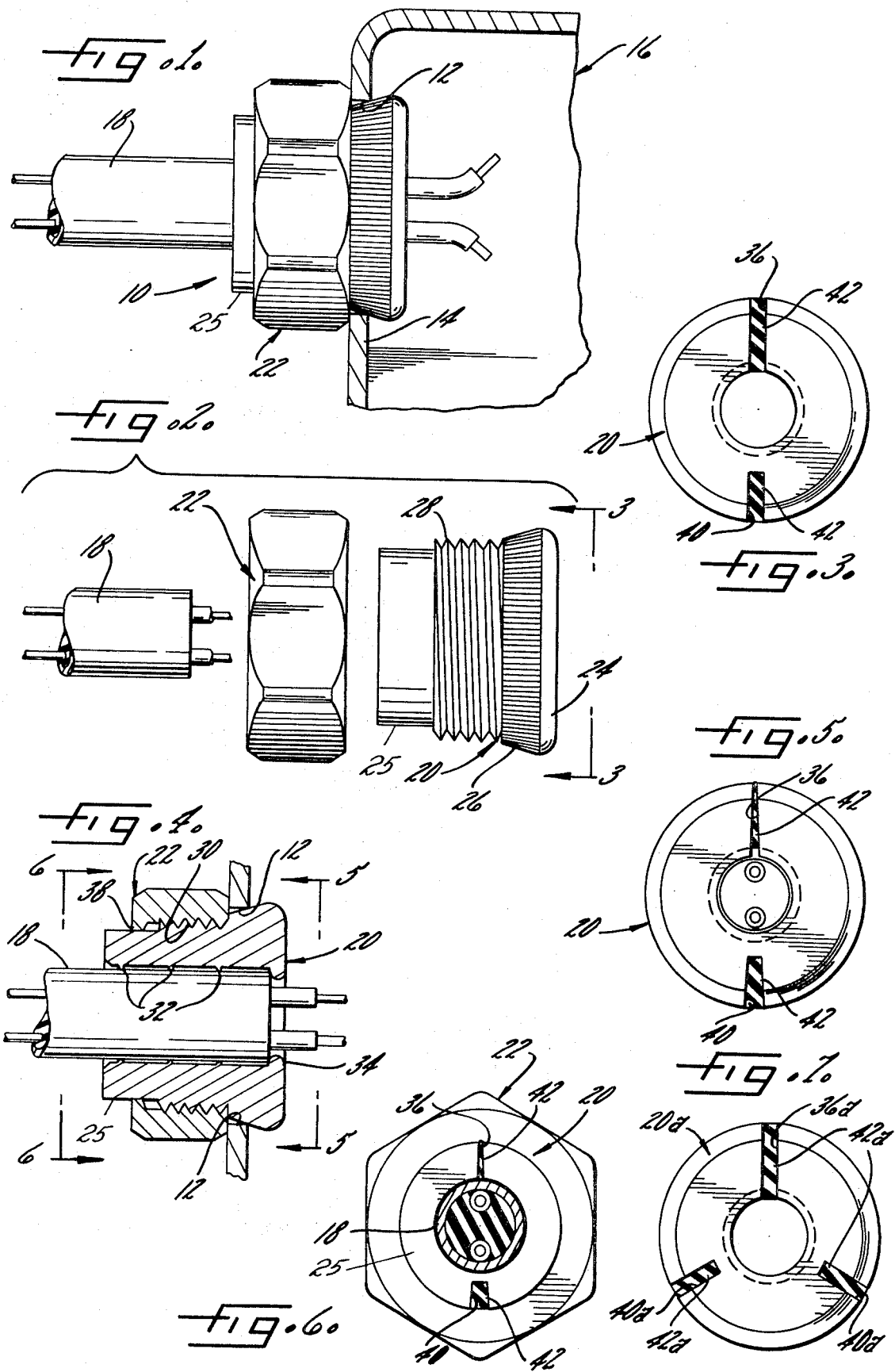

3,801,131

SEALED ELECTRICAL CONNECTOR FOR SECURING CONDUITS TO JUNCTION BOXES

CROSS REFERENCE TO RELATED APPLICATION

This application is a continuation-in-part of my co-pending application Ser. No. 280,515 filed Aug. 14, 1972, now abandoned.

The present invention generally relates to electrical fittings and, more specifically, to connectors particularly adapted for use in securing flexible electrical conduits to liquid tight and dust tight junction boxes, outlet boxes and the like.

Once recent development in the electrical construction industry finding increasing acceptance in the trade is an aluminum sheathed cable wherein the electrical conductors are integrally encased in an aluminum sheath or tube. The combination is intended to function as a substitute for separately installed conduit and electrical conductors. By utilizing such integral design, it is unnecessary to install conduit and thereafter pull the electrical conductors through it, since the installation of the aluminum sheathed cable can be performed in a single operation. In addition to the obvious labor saving advantage of the design, material cost savings are also realized for the reason that the outside diameter of the aluminum sheath is typically smaller than conventional conduit sized in accordance with the provisions of the National Electrical Contractor's Association Handbook.

However, the smaller outside diameter of the aluminum sheathed cable does present a problem in that most conventional fittings or connectors are not compatible with the new sheathed cable, particularly when the connectors are of the type that are intended to clamp the outside of the aluminum sheath. Moreover, most commercially used junction boxes and outlet boxes typically have knockouts or openings in them which are sized to accommodate conventional conduit (½ inch, ¾ inch, 1 inch, etc.).

Since it is desirable to use junction and outlet boxes and the like which are presently accepted and enjoy widespread use in the industry, it is also desirable to have an electrical connector or fitting that will adequately secure the smaller diameter aluminum sheathed cable to such boxes. In this regard reference is made to A.I. Appleton U.S. Pat. No. 2,674,470 wherein there is disclosed a connector for securing conduit to a junction that buttresses the conduit against lateral rocking by using the exterior of the box wall as a footing. However with flexible cable, there is insufficient rigidity to utilize this prior principle.

Accordingly, it is an object of the present invention to provide a connector for securing one end of an unthreaded non-rigid electrical cable to the sidewall of an outlet box or the like having a knockout or other opening therein, wherein the outside diameter of the cable is significantly smaller than the diameter of the opening.

Another object of the present invention is to provide an electrical connector having a bushing and a nut, wherein the bushing is constricted to uniformly clamp the conduit, notwithstanding a relatively thick-walled bushing that is necessary for securing the smaller conduit to an outlet box or the like having standard size openings that are substantially larger in comparison.

A more specific object of the present invention is to provide an electrical connector of the above type wherein the bushing has a longitudinally split portion as well as one or more longitudinal external slots which provide a reduced bushing wall thickness, and enable bending of the bushing wall to facilitate constriction and concomitantly provide more uniform clamping around the circumference of the conduit.

Still another specific object lies in the provision of generally equally spacing the slots and split portion around the circumference to provide generally optimum uniform clamping of the conduit during constriction of the bushing.

Yet another object of the invention lies in the provision of providing a rubber-like, deformable material in the slots and split portion to substantially prohibit the passage of fluid therethrough.

Other objects and advantages will become apparent upon reading the ensuing specification, while referring to the attached drawings.

BRIEF DESCRIPTION OF DRAWINGS

FIG. 1 is a fragmentary plan view of an outlet box equipped with an illustrative electrical conductor embodying the present invention;

FIG. 2 is an enlarged exploded plan view of the illustrative connector shown in FIG. 1;

FIG. 3 is an end view of the bushing portion of the illustrative connector taken generally in the direction of the lines 3—3 of FIG. 2;

FIG. 4 is an enlarged fragmentary horizontal sectional view through the box and connector of FIG. 1;

FIGS. 5 and 6 are end views of the box, conduit and connector and are taken in the direction of the respective lines 5—5 and 6—6 shown in FIG. 4; and FIG. 7 is a view similar to FIG. 3, but showing a slightly modified connector also embodying the present invention.

While the invention is susceptible of various modifications and alternative constructions, certain preferred embodiments have been shown in the drawings and will be described below in considerable detail. However, it should be understood that there is no intention to limit the specific forms disclosed, but, on the contrary, the intention is to cover all modifications and alternative constructions falling within the spirit and scope of the invention.

DESCRIPTION OF THE PREFERRED EMBODIMENTS

Referring more specifically to the drawings, there is shown in FIGS. 1 to 6, an illustrative connector 10 embodying the present invention, and in FIGS. 1, 4 to 6, the connector 10 is shown installed in a knockout aperture or opening 12 located in a sidewall 14 of an outlet box 16. The connector 10 receives and secures a cable or conduit 18 such as an aluminum sheathed cable or the like which has an outside diameter substantially smaller than the inside diameter of the knockout opening 12 of the outlet box 16.

As is more clearly illustrated in the exploded side view of FIG. 2, the connector 10 comprises a bushing 20 and a nut 22 which are adapted to secure the conduit to an outlet box or the like. Referring to FIGS. 2 and 4, it is seen that the bushing 20 is of relatively thick-walled and hollow construction with a radially enlarged annular head 24 at the inner end thereof, the head 24 having an annular surface that is radially inwardly inclined toward the outer end thereof as shown at 26. The radially inwardly inclined surface 26 preferably contains longitudinal ribs as shown so that when the bushing and nut are tightened relative to one another, the ribs will engage the wall 14 of the outlet box 16 and substantially prohibit relative rotational movement between the bushing and wall as the nut 22 is tightened.

To effect tightening of the bushing and the nut, the bushing is provided with external threads 28 positioned adjacent its inner end portion which are adapted to cooperate with internal threads 30 of the nut 22.

To enable the bushing 20 to slidingly receive the conduit 18, its inside diameter is preferably slightly larger than the outside diameter of the conduit. The bushing is also provided with a number of annular ridges 32 on its interior surface which are adapted to forcibly clamp the conduit 18 when the connector is applied.

To effect secure engagement between the conduit 18 and the box wall 14, the bushing 20 is inserted through the opening 12 with the radially enlarged annular head 24 on the inside of the box. The clamping nut 22 is then preferably placed on the conduit 18 and the conduit is slidably inserted into the bushing until it engages a radially inwardly projecting conduit stop abutment 34 located at the inner end of the bushing. The clamping nut is then threaded onto the bushing until the inner ends of the nut abut against the edge portion of the box wall surrounding the opening or aperture 12. Continued tightening of the nut tends to draw the annular head 24 into the opening 12 with the result that the surrounding portion of the box wall 14 exerts a powerful squeezing action that effectively clamps the bushing in place.

To more effectively translate the squeezing action on the outside of the bushing into a clamping force for securely clamping the conduit 18, the bushing is provided with a longitudinally split portion defining a gap 36 that extends the entire length of the bushing as shown in FIG. 3. Thus, advantage is taken of the squeezing action to clamp the end portion of the conduit 18 rigidly within the bore of the bushing and, consequently, as the clamping nut 22 draws the annular head 24 into the opening 12, the radially inwardly inclined annular surface 26 is squeezed which has an effect of constricting the bushing by reducing the width of the gap 36 and thereby clamping the outer surface of the conduit 18 as is shown in FIGS. 5 and 6.

In keeping with the present invention, and referring particularly to FIGS. 3, 5 and 6, the bushing 20 is provided with an external longitudinal slot 40 which is preferably positioned opposite the longitudinally split portion. As previously mentioned, the bushing 20 has a relatively thick wall, owing to the fact that the conduit 18 is substantially smaller in diameter than the size of the conventional knockout opening 12 in the outlet box 16. Since the connector is particularly adapted for use where there is significant disparity between the relative sizes of the opening and the conduit that is to be secured, it is necessary for the bushing to have a relatively thick-walled construction. It has been found that when the clamping nut is tightened on the bushing, an inordinately high amount of force is required to reduce the width of the gap of the split portion due to the thick-walled construction.

Since the wall thickness may substantially impede the constriction of the bushing, i.e., impede the reduction of the width of the gap, during turning of the clamping nut, the external longitudinal slot 40 provides an area of reduced wall thickness which will enable easier bending and enable the width of the gap to be more easily reduced with normal forces applied during tightening of the nut. With the location of the external slot 40 substantially diametrically opposite the gap 36, the clamping of the conduit will be more uniform around the entire circumference of the conduit. Stated in other words, the split portion and the external slot are preferably equally spaced around the circumference of the bushing to assure optimum uniformity of clamping force or pressure.

Since the connector embodying the present invention is particularly adapted for use in locations where liquid and dust tight electrical installations are required or desired, the bushing 20 is provided with a rubber-like, deformable material 42 which is inserted in the split portion 36 as well as each of the slots 40. The material 42 is preferably compressed when inserted so that it will not fall out during shipping and normal handling. Additionally, when the bushing is constricted, the width of the slots 40 will be increased as shown in FIG. 5, and accordingly, the material 40 should expand to maintain the barrier and substantially prohibit the passage of fluid or dust therethrough.

In accordance with another aspect of the invention, provision is made to rigidly support the connector against the box so that lateral rocking is effectively avoided. To this end, the connector bushing 20 includes a reduced diameter smooth cylindrical portion 25 projecting beyond the threads 28. The nut 22 having the inwardly depending radial flange 38 which rides on the cylindrical portion 25 provides a rigid force transfer medium to the wall of the outlet box 16. A snug fit between the flange 38 and cylindrical portion 25 insures that loose fits otherwise present in the threads will not occasion or facilitate easy loosing of the nut with the slight rocking otherwise available.

Turning now to FIG. 7, there is shown a modified connector bushing 20a, which is generally similar to the connector bushing 20, but is provided with two external slots 40a in addition to the split portion defining a gap 36a. In this construction, it is seen that the split portion, together with the external slots, are substantially equally spaced around the circumference of the bushing 20a, so that bending can occur at the reduced wall thickness of each of the slots 40a and provide optimum clamping of the conduit when it is applied to secure a conduit to an outlet box or the like. The rubber-like material 42a is also provided for each of the slots as well as for the gap in the split portion.

I claim as my invention:

1. A connector for securing one end of an unthreaded flexible electrical cable to a sidewall of an outlet box or the like, with the cable end extending through a knockout opening in the box which is relatively larger than said cable, comprising, in combination:

a relatively thick-walled, hollow, bushing adapted to fit into the knockout opening and slidably receive the cable therein, said bushing having a longitudinally split rear portion and one or more external longitudinal slots, said one or more slots and said split rear portion being generally equally spaced around the circumference thereof, each of said one or more slots and said split rear portion containing a rubber-like deformable material therein for substantially prohibiting the passage of fluid therethrough, said bushing having a radially inwardly projecting conduit stop abutment on the inner end thereof, the outer end of said bushing having a reduced diameter smooth cylindrical portion and external threads intermediate the ends of the bushing, a radially enlarged annular head at the inner end thereof, said head having an annular surface radially inwardly inclined toward the outer end thereof, a clamping nut internally threaded to fit on the external threads of said bushing from the direction of the outer end thereof, the inner end of said nut defining an annular surface adapted to abut against the sidewall of the box for forcing said head into engagement with the sidewall edges defining said opening to constrict said bushing for clamping the conduit, the constriction of said bushing occurring by reducing the spacing of the bushing at said split portion, said one or more slots providing a reduced bushing wall thickness enabling bending thereof during constriction and thereby providing generally uniform clamping around the conduit, said nut having an inwardly depending radial flange which engages the reduced diameter portion of said bushing for lending support against rocking of the bushing.

2. A connector as defined in claim 1 wherein said bushing includes at least two of said longitudinal external slots.

* * * * *